June 20, 1950 L. L. SALFISBERG 2,512,216
WEB FEEDING DEVICE
Filed May 31, 1946 9 Sheets-Sheet 1

INVENTOR.
Leroy L. Salfisberg
BY
Harry R. Rok
ATTORNEY

June 20, 1950   L. L. SALFISBERG   2,512,216
WEB FEEDING DEVICE

Filed May 31, 1946   9 Sheets-Sheet 2

INVENTOR.
Leroy L. Salfisberg,
BY
Harry R. Cook,
ATTORNEY

June 20, 1950 L. L. SALFISBERG 2,512,216
WEB FEEDING DEVICE

Filed May 31, 1946 9 Sheets-Sheet 4

INVENTOR.
Leroy L. Salfisberg,
BY
Harry V. Cook,
ATTORNEY

June 20, 1950  L. L. SALFISBERG  2,512,216
WEB FEEDING DEVICE

Filed May 31, 1946  9 Sheets-Sheet 6

INVENTOR.
Leroy L. Salfisberg
BY
Harry W. Look
ATTORNEY

Patented June 20, 1950

2,512,216

UNITED STATES PATENT OFFICE 2,512,216

WEB FEEDING DEVICE

Leroy L. Salfisberg, South Orange, N. J., assignor to Ivers-Lee Company, Newark, N. J., a corporation of Delaware Application May 31, 1946, Serial No. 673,394

15 Claims. (Cl. 271—2.6)

This specification relates in general to the simultaneous fabricating and filling of packages, and more particularly pertains to the packaging or wrapping of substances capable of flowing, such as powder, granular material or small articles.

Specifically, the invention is directed to the packaging or wrapping of substances or articles in thin sheet material, for example, metallic foil, paper, cellophane, "Pliofilm," and especially sheet material which itself is thermoplastic or has a thermoplastic or fusible coating so that juxtaposed layers of the material can be fused or caused to adhere together by application of heat and pressure to form a seal.

The machine embodying the invention is related in some respects to the machines shown in my United States Patents No. 2,245,827, dated June 17, 1941, and No. 2,350,930, dated June 6, 1944, wherein two continuous layers of packaging material are fed into juxtaposition step by step, secured together simultaneously along their longitudinal margins and in transverse zones at the end of each step of movement to form a baglike container having an open end through which substance to be packaged is deposited and which is sealed simultaneously with the formation of the next succeeding container, so as to form a chain of closed containers from which the containers may be severed individually or in groups.

It is common practice in the making of such chains of containers to utilize continuous layers or strips of packaging material which carry printed matter, such as trade-marks and advertising, for each individual container or package, and it is essential that this printed matter be properly in register or centered upon the respective sides of the closed and finished container or package. However, in the making of such chains of packages, due to varying atmospheric conditions, stretching or contraction of the packaging material, or slippage thereof in the feeding rolls, the printed areas of the strips get out of register with the dies which seal the layers or strips together so that said printed areas are not properly centered between the transverse sealing zones that form two opposite margins of the respective packages. Furthermore, the chain of packages gets out of proper relation to the severing mechanism so that the packaging layers or strips may be severed transversely of one of the printed areas. The resulting packages are frequently unsightly and generally are discarded, which results in substantial loss.

Therefore, one object of my invention is to provide a method and machine of the general character described, which shall include novel and improved mechanism for periodically and at will adjusting the feed of the packaging strip or layers so as to maintain proper register of certain areas on the strip or layer, such as printed or ornamental matter, with the sealing dies, whereby to ensure that said areas shall be properly centered or otherwise located in predetermined relation to the respective packages.

Another object is to provide such a mechanism which shall embody novel and improved features of construction, whereby the feed of the packaging material can be periodically increased or decreased at will and in varying amounts as desired.

It is also known by those skilled in the art that the amounts of the substance to be packaged varies at different times depending upon the nature of the substance, the sizes of the packages, etc., and therefore other objects of my invention are to provide novel and improved means for varying the quantities of the substance deposited in the packages, and more particularly to provide a novel and improved measuring valve and means for operating it, whereby measured or predetermined quantities of material may be drawn from a source of supply and deposited into the packages.

Further objects are to provide a novel and improved method of and machine for forming a chain of packages which comprise two superposed layers of packaging material formed from a single folded strip, and thus to provide a novel and improved method of and apparatus for folding longitudinally a strip or web of packaging material as the latter is drawn from a supply roll, so as to provide two superposed layers, and for sealing said layers together along their longitudinal margins and in transverse zones to form in succession bag-like containers each having an open upper end; and to provide novel and improved means for depositing the substance to be packaged into said open end and for sealing said open end simultaneously with the formation of the next succeeding container.

Other objects are to provide a machine of the particular character described which shall include a novel and improved combination and arrangement of the strip-folding means, strip-feeding means, a substance-depositing mechanism and sealing means, whereby packages can be automatically, quickly and relatively inexpensively formed and filled; to provide such a machine which shall be simple and reliable in construction and operation, and to obtain other advantages and results that will be brought out by the following description in conjunction with the accompanying drawings, in which.

Figures 1, 14:
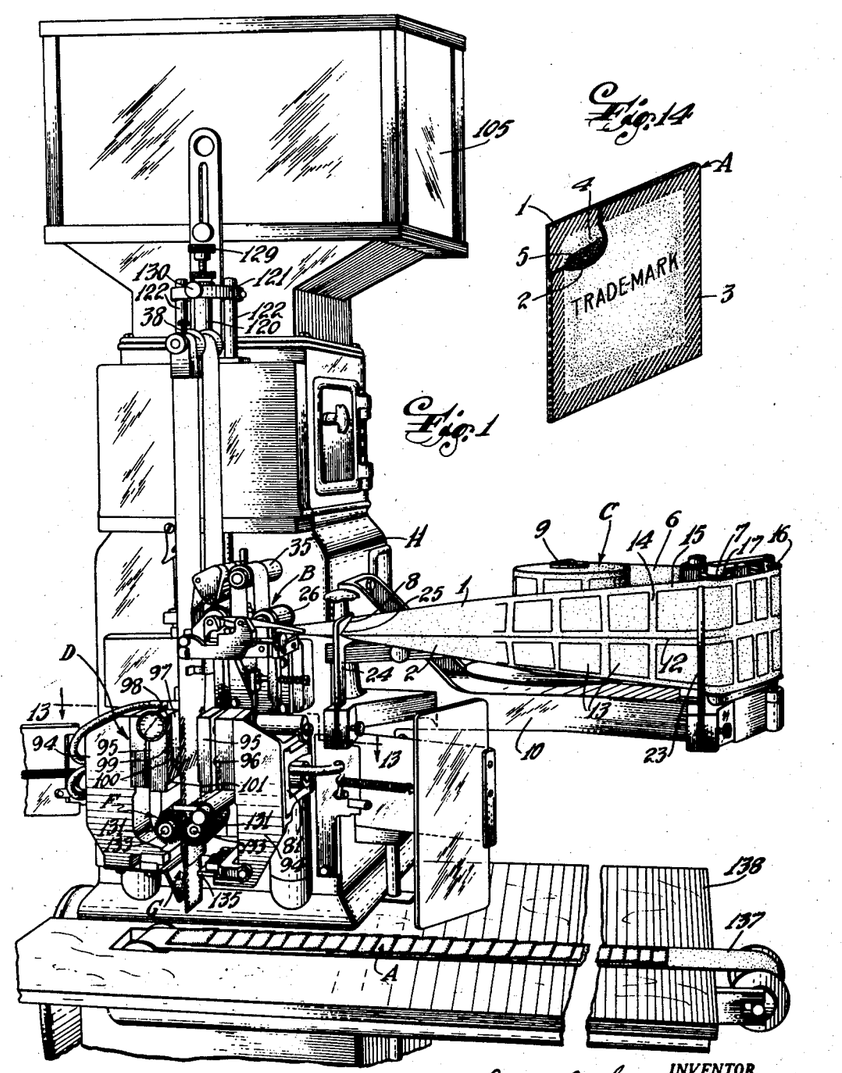
Figure 1 is a front perspective view of a machine embodying my invention.
Figure 14 is a detached perspective view of one of the packages formed by the machine and method embodying the invention, with portions broken away for clearness in illustration.
Figure 2:
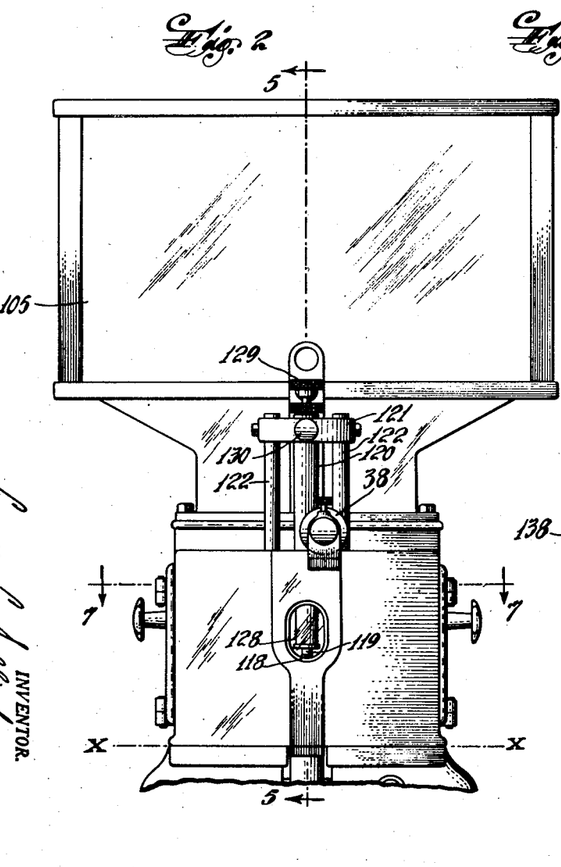
Figure 2 is a front elevational view of the upper portion of the machine.

While my method and machine may be utilized for making different packages, for the purpose of illustration I have shown it for fabricating and filling a package A which comprises two layers 1 and 2 of packaging material such as paper, that are formed by folding a strip longitudinally, said layers being secured together at their margins adhesively and also preferably by interdigitations or corrugations, as indicated at 3, to form an envelope-like container or commodity-receiving body portion 4 in which the substance 5 to be packaged, for example, granular, dry yeast, is deposited. Preferably, the juxtaposed surfaces of the two layers 1 and 2 have coatings of a thermoplastic composition by which the layers are sealed together under application of pressure and heat.

Describing my method and machine in their broader aspects, a strip or web 6 of packaging material is drawn step by step by a feeding mechanism B from a supply roll C and around a folding mechanism including a roller 7 and a guide 8 to form the two superposed layers 1 and 2. At the end of each step of movement the two layers 1 and 2 are sealed together by sealing mechanism generally designated D along their longitudinal edges and transversely, to form a bag-like receptacle having its mouth facing upwardly between the layers and to simultaneously close the open end of the next preceding container that was formed at the end of the immediately preceding step of movement. In the interval between the steps of movement and prior to the partial formation of each container above described, the substance or article to be packaged is deposited by a filling mechanism E into the mouth of the preceding container.

The feeding mechanism B draws from the roll C at each step predetermined quantities of the strip 6 required to form a single package, and an auxiliary feeding mechanism F constantly exerts tension on the strip so as to draw said quantities of the strip downwardly into proper position relative to the sealing means D, and at the same time moves the package strip or chain of containers downwardly to a severing mechanism G which successively separates the packages from each other or from the strip. The roll C of packaging material is shown as mounted on a spindle 9 that is journaled on a bracket 10 which is mounted on one side of the machine housing H, and the strip of packaging material is shown (Fig. 1) of a width adequate to form both layers 1 and 2 of the package A when the strip is folded along its longitudinal median line which is designated 12 in Figure 1. At opposite sides of the median line 12 and spaced longitudinally of the strip are a plurality of areas 13 one of which is intended to appear on each side of each package in predetermined relation thereto, for example, centrally thereof. As shown, the areas 13 are spaced from each other longitudinally of the strip equidistantly, as indicated at 14, and in these spaces the layers are sealed together in forming the individual packages. Similar portions 15 appear along the margins of the strip 6 and at opposite sides of the fold line 12, and the layers are also sealed together in these areas 15 to complete the packages.

Figure 4:
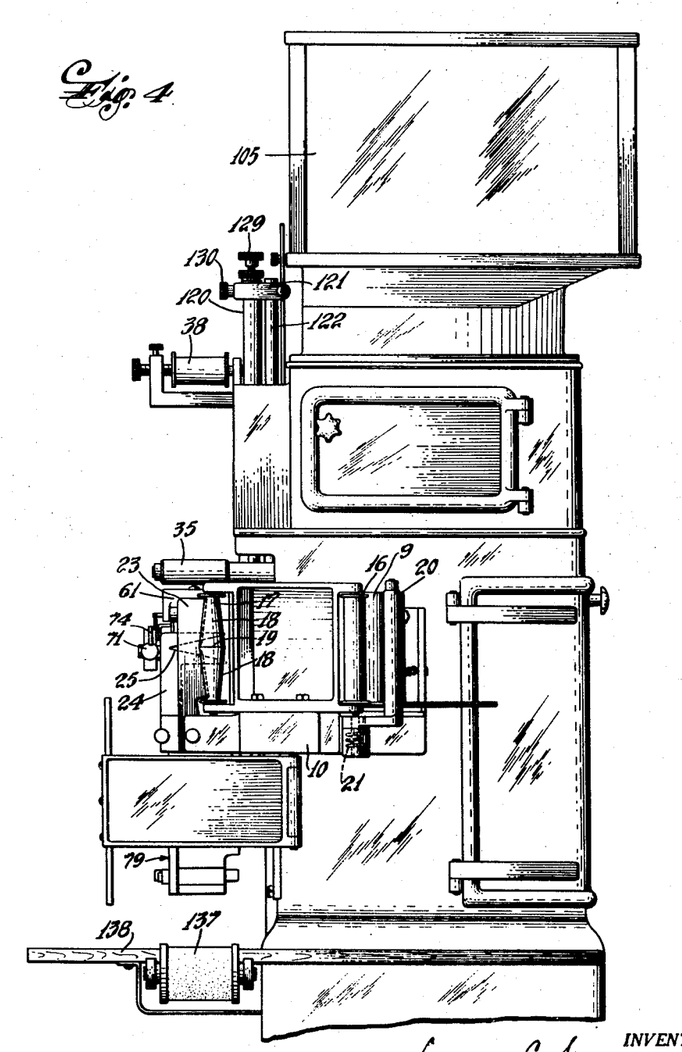
Figure 4 is an end elevational view of the machine, viewing it approximately from the plane of the line 4—4 of Figure 3.

The invention contemplates novel and improved means for folding the strip 6, which are shown as comprising a guide roller 16 around which the strip is led from the roll C, and a creasing roller 17 which has two frusto-conical surfaces 18 having their larger ends meeting in a circumferential ridge 19 midway of the length of the roller. Preferably a spring take-up roller 20 is normally pressed against the strip by a spring 21 (Fig. 4) so as to maintain the strip under tension between the roll and the feeding mechanism B, there being also preferably a drag or brake bar 22 to restrain rotation of the roll under the pull exerted on the strip by the feeding means B.

With this construction, the ridge 19 creases the strip 6, as indicated at the fold line 12, and to ensure constant and proper pressure of the strip against the roller 17, a guide bar 23 is mounted on the bracket 10. After the partially folded strip leaves the creasing roller 17, it is passed through a folding guide 24 which has a V-shaped notch 25 by which the folding of the strip is substantially completed.

The folded strip passes from the guide 24 around a guide roller 26 which is journaled on an auxiliary frame 27 that is secured by cap screws 28 to the front wall of the main housing H of the machine. This roller 26 forms a part of the feeding mechanism B and with it cooperates a brake 29 between which and the roller the strip 6 is passed, as indicated by dot and dash lines in Figure 11. This brake is mounted on a shaft 30 and is normally influenced toward the roller 26 by a compression spring 31 that is interposed between a handle arm 32 on the brake and the head of a screw 33 which is secured in the frame 27. By pulling outwardly on the handle 32, the brake may be swung away from the roller 26 against the influence of the spring 31. Rigidly connected to the brake is an operating arm 34 whereby the brake may be periodically actuated away from the roller 26 in timed relation to the main feeding element 35 and the sealing mechanism D.

From the roller 26 the strip 6 is led upwardly around the feeding element 35 and then downwardly and beneath a feed-adjusting roller 36, thence upwardly through a second brake which includes a rod 37 having a yieldable coating such as rubber, and thence upwardly over a top guide roller 38 and then downwardly between the dies of the sealing mechanism D to the auxiliary feed mechanism F.

Figures 6, 11:
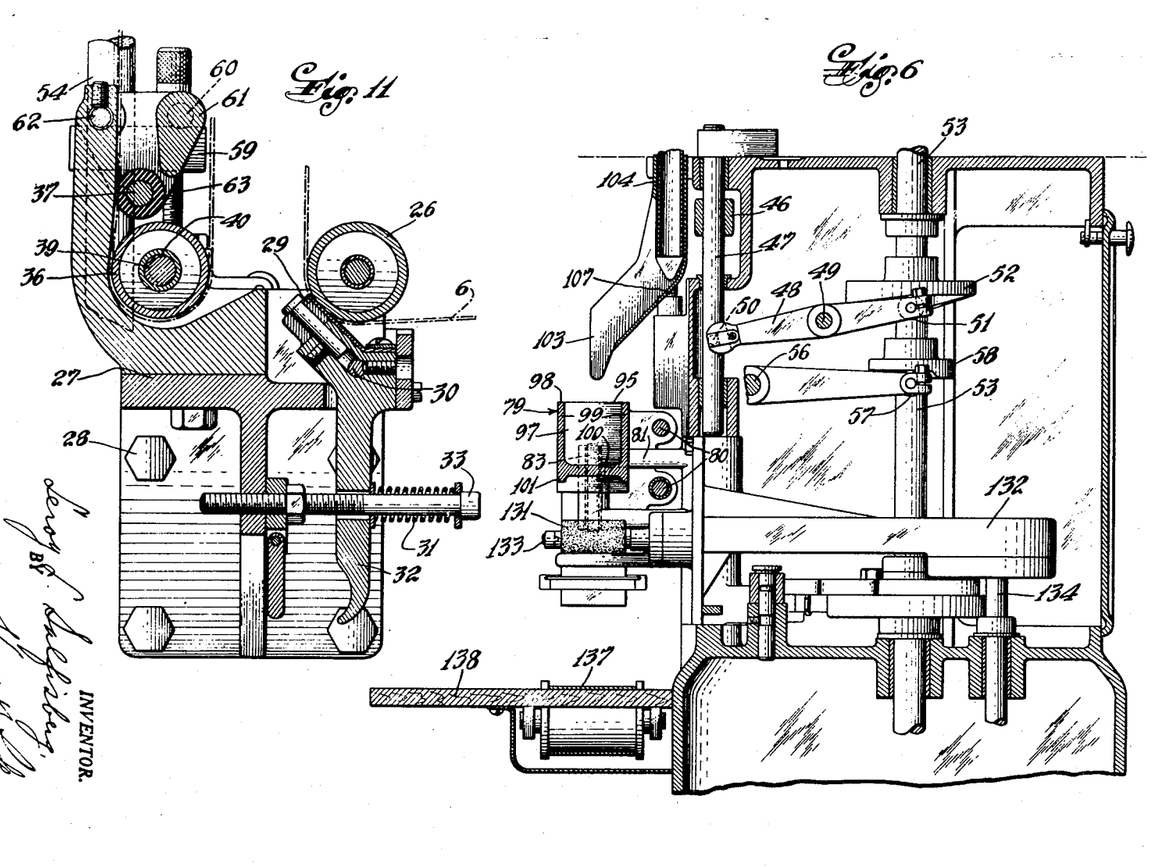
Figure 6 is a similar view approximately on the line 6—6 of Figure 3.
Figure 11 is a vertical longitudinal sectional view on the line 11—11 of Figure 10.
Figure 12:
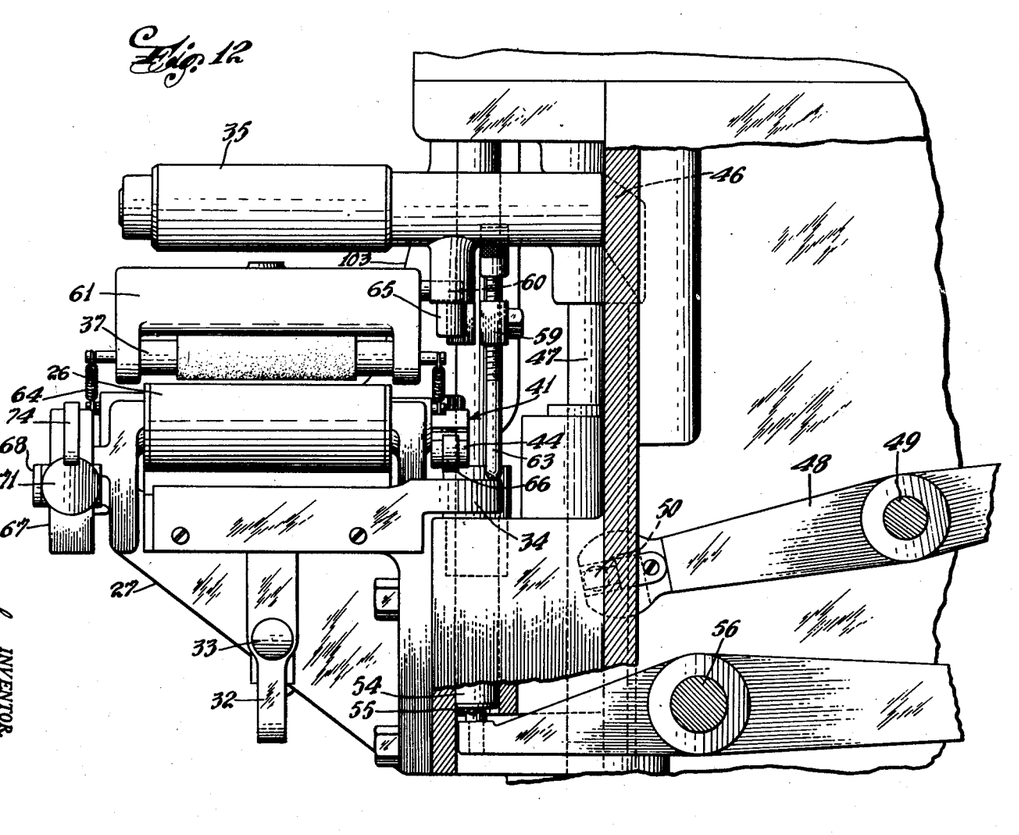
Figure 12 is a fragmentary transverse vertical sectional view approximately on the line 12—12 of Figure 3, with portions broken away for clearness in illustration.

The feed-adjusting roller 36 is rotatably mounted on a shaft 39 which has eccentric end portions 40 journaled in the frame 27 to one of which is rigidly connected a bell crank lever 41 between one arm of which and a stud 42 on the auxiliary frame 27, is interposed a compression spring 43 which normally influences the other arm 44 of the bell crank upwardly until such movement is limited by engagement of a stud 45 on the bell crank with the end of a slot 45a in the auxiliary frame 27. With this construction, it will be observed that by oscillation of the bell crank lever 41, the true axis of rotation of the roller 36 may be swung or oscillated upwardly and downwardly so as to vary the distance between the lowermost point on the periphery of said roller and the uppermost point on the periphery of the main feeding element 35 which is reciprocated vertically by an arm 46 that is carried by a rod 47 (Figs. 6 and 12). The rod 47 is vertically reciprocable in the main housing of the machine by a lever 48 which is pivotally mounted between its ends on said housing, as at 49, and has one end pivotally connected to said rod at 50 and its other end carrying a follower roller 51 which follows a cam 52 that is mounted on a drive shaft 53 which is connected to any suitable source of power (not shown). This feeding element, which is preferably in the form of a roller, is so actuated by the cam 52 that, in conjunction with the two brakes 29 and 37, upon each upward movement of the feeding element a predetermined quantity of the strip 6, particularly a quantity necessary to form a single package, is withdrawn from the supply roll C. The two brakes 29 and 37 are so operated that when the feeding element 35 moves upwardly the brake 37 holds the strip against movement while the brake 29 is released to permit the strip to be pulled from the supply roll, while when the feeding element moves downwardly, the brake 29 holds the strip and the brake 37 releases the strip which thereupon is pulled through the sealing mechanism by the auxiliary feeding means F.

For so operating the brakes 29 and 37, I have provided a vertically reciprocable rod 54, the lower end of which is abutted by one end of a lever 55 which is pivotally mounted intermediate its ends at 56 in the machine housing and has a follower roller 57 at its other end cooperating with a cam 58 on the shaft 53. Mounted on the rod 54 is a lateral arm 59 which underlies and is adapted to cooperate with a pin 60 on a rocker frame 61 which carries the brake 37 and is pivotally mounted at 62 on the auxiliary frame 27, said arm 59 also having an adjustable tappet rod 63 to cooperate with the arm 34 on the brake 29. As shown, the rocker frame 61 is normally actuated by a spring 64 to hold the brake 37 in strip-holding position. When the rod 54 rises, the brake 29 is actuated by the spring 31 to grip the strip, being released by the tappet rod 63, and at the same time the arm 59 engages the pin 60 to swing the brake 37 into strip-releasing position. When the rod 54 descends, the arm 59 permits the spring 64 to swing the brake 37 into strip-holding position and the tappet rod 63 engages the arm 34 to swing the brake 29 into strip-releasing position.

Frequently during the operation of such machines, for example, when the areas 15 of the packaging strip get out of proper register with the sealing dies, it is necessary to temporarily speed up or slow down the feed of the packaging strip, for example, to bring the said areas of the strip again into register with the dies. This result is accomplished in my machine by the feed-adjusting roller 36. Normally said roller is adjusted by the stud 45 so that upon swinging of its axis upwardly or to the left (Fig. 11), the amount of the strip withdrawn from the supply roll upon the feeding or upward movement of the feeding element 35, will be decreased, while when said axis of the roller 36 is swung downwardly or to the right, the amount of packaging strip fed by the feeding element 35 will be increased. It will be remembered, as above explained, that the swinging of the axis of the roller 36 by its eccentrically mounted shaft 39, will change the distance between the lowest point on the surface of said roller and the highest point on the surface of the feeding element 35, and consequently will change the length of the portion of the strip between said two points which of course varies the feed of the strip. In order to increase or decrease the amount of strip fed during a given strip feeding movement of the feeding element relative to the amount fed by a preceding feeding operation, it is necessary to oscillate the feed-adjusting roller during each movement of the feeding element. This is effected by the provision of a tappet stud 65 on the arm 46 which carries the feeding element 35 to cooperate with a roller 66 on the arm 44 of the bell crank lever 41, so that when the feeding element approaches its lowermost position, the tappet stud 65 will engage the roller 66 and rotate the shaft 39 of the feed-adjusting roller and thereby swing the axis of the latter upwardly or to the left in Fig. 11, and when the feeding element rises the spring 43 will swing said axis of the roller 36 downwardly or to the right.

Figure 8:
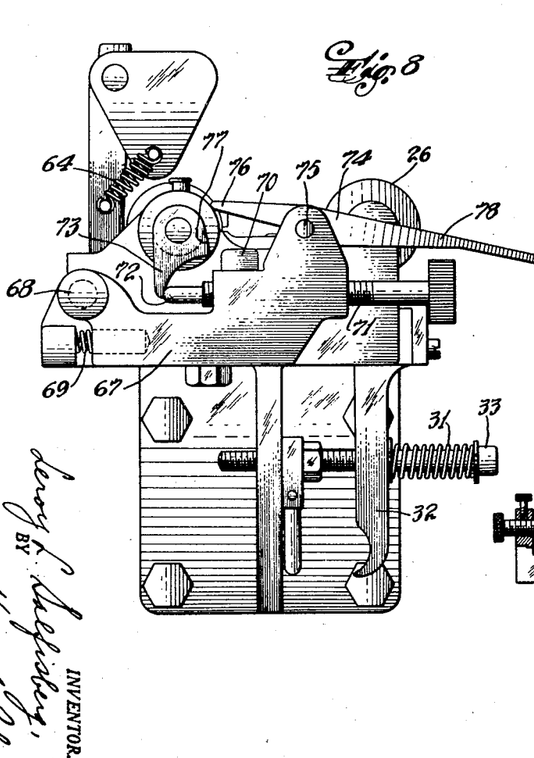
Figure 8 is an enlarged detached front elevational view of the strip feed adjusting mechanism.
Figure 9:
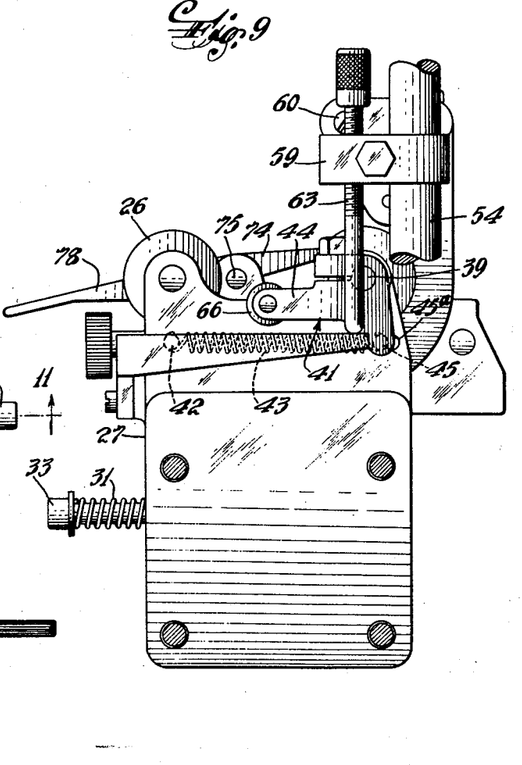
Figure 9 is a rear elevational view of the mechanism shown in Figure 8.
Figure 10:
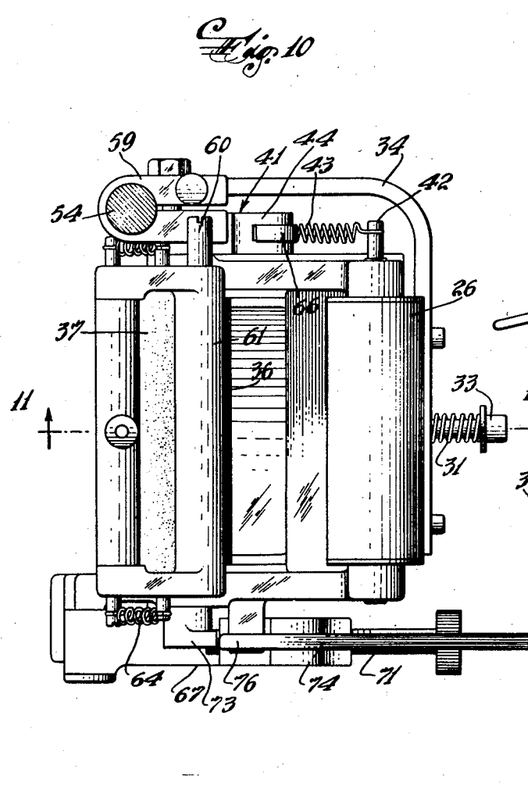
Figure 10 is a top plan view of said mechanism.

In order to vary the extent of swinging of the feed-adjusting roller, I have shown an adjusting block 67 pivotally mounted at 68 on the auxiliary frame 27 and normally influenced upwardly by a compression spring 69 against a stop lug 70. In this lever is an adjusting screw 71 one end 72 of which is normally disposed in the path of a regulating arm 73 that is rigidly connected to the shaft 39, said regulating arm normally being influenced against the end 72 of the adjusting screw by the spring 43. It will be seen that by adjusting the screw 71, minute changes may be effected in the extent of swinging of the regulating arm 73 and consequently in the amount of feed of the strip 6. Should it be desired to rapidly increase the amount of feed to the maximum, the block 67 may be swung downwardly by slightly rotating it manually about its pivot 68 in a clockwise direction, Figure 8, i. e., away from stop lug 70, against the influence of spring 69 and holding it in that position, whereby the end 72 of the adjusting screw will be moved out of line with the regulating arm 73 and shaft 39 will be rotated until the pin 45 engages the end of the slot 45a. On the other hand, should it be desired quickly to reduce the feed to the minimum, a lever 74 is provided and pivoted at 75 intermediate its ends on the block 67 with one end 76 adapted to engage a surface 77 on the regulating arm 73 in such a manner as to force said arm and consequently the shaft 39 to the left in Figures 8 and 11, to provide a minimum of distance between the lowest point on the surface of the feed-adjusting roller 36 and the high point on the feeding element 35. The lever 74 is normally held out of operative relation to the regulating arm 73 by gravitational action on the handle end 78 of the lever.

With this construction, it will be seen that quantities of the strip 6, each sufficient to form a single package, are withdrawn step by step from the source of supply and periodically the feed may be increased or decreased to compensate for inaccuracies in the feeding operation. From the feeding mechanism B the strip is pulled downwardly over the roller 38 through the sealing mechanism D, as best shown in Figure 1.

This sealing mechanism includes two sealing jaws 79 that are mounted to reciprocate toward and from each other in a horizontal plane and are guided in accurate alinement with each other during their movements by guide rods 80 each of which is fixedly mounted in one of the jaws and is slidable in openings in the other jaw. Each jaw is carried by an arm 81 which is rotatably mounted on a vertical shaft 82 secured in the housing of the machine, the arm being pivotally connected to the jaw at 83. These arms are simultaneously oscillated to move the jaws alternately toward and from each other by the respective arms 84 connected by links 85 to a slide 86 that has slots 87 and 88 which engage the respective guide blocks 89 and 90. The slide carries a roller 91 that follows a cam groove 92 in a disc 93 which is keyed on the main drive shaft 53.

The two jaws are substantially identical in construction, and each includes a body portion 94 on which is mounted a crimping and sealing block 95. Preferably, one of the blocks is movable toward and away from the corresponding body portion, and springs 96 are provided to yieldingly resist movement of the sealing block toward the body portion under the pressure exerted during the sealing operation on the package strip.

Each sealing block has a recess 97 in its face which is surrounded on three sides by a rim 98 having suitable corrugations or serrations. Where the package is to be approximately rectangular in shape, as shown, the rim and corrugations are arranged in the manner corresponding to three sides of the rectangular package, as shown in Figures 1 and 6.

In the present instance, the package has the packaging material crimped and sealed along four edges of the package, and each sealing block has two vertically disposed parallel series of corrugations 99 to grip the longitudinal edges of the two layers 1 and 2 of the folded strip 6, and a horizontal series of corrugations 100 to grip said layers transversely. The length of the series 99 is somewhat greater than the corresponding sides of the package to be formed, and below the transverse series 100 is a pair of short series of corrugations 101 to supplement the series 99 and form round corners on the commodity-receiving compartment 4 of the package at the juncture of the transverse series 100 and the vertical series 99. The transverse series is of a width corresponding to the width of the bottom edge of one package and the top edge of the next preceding package.

Figure 3:
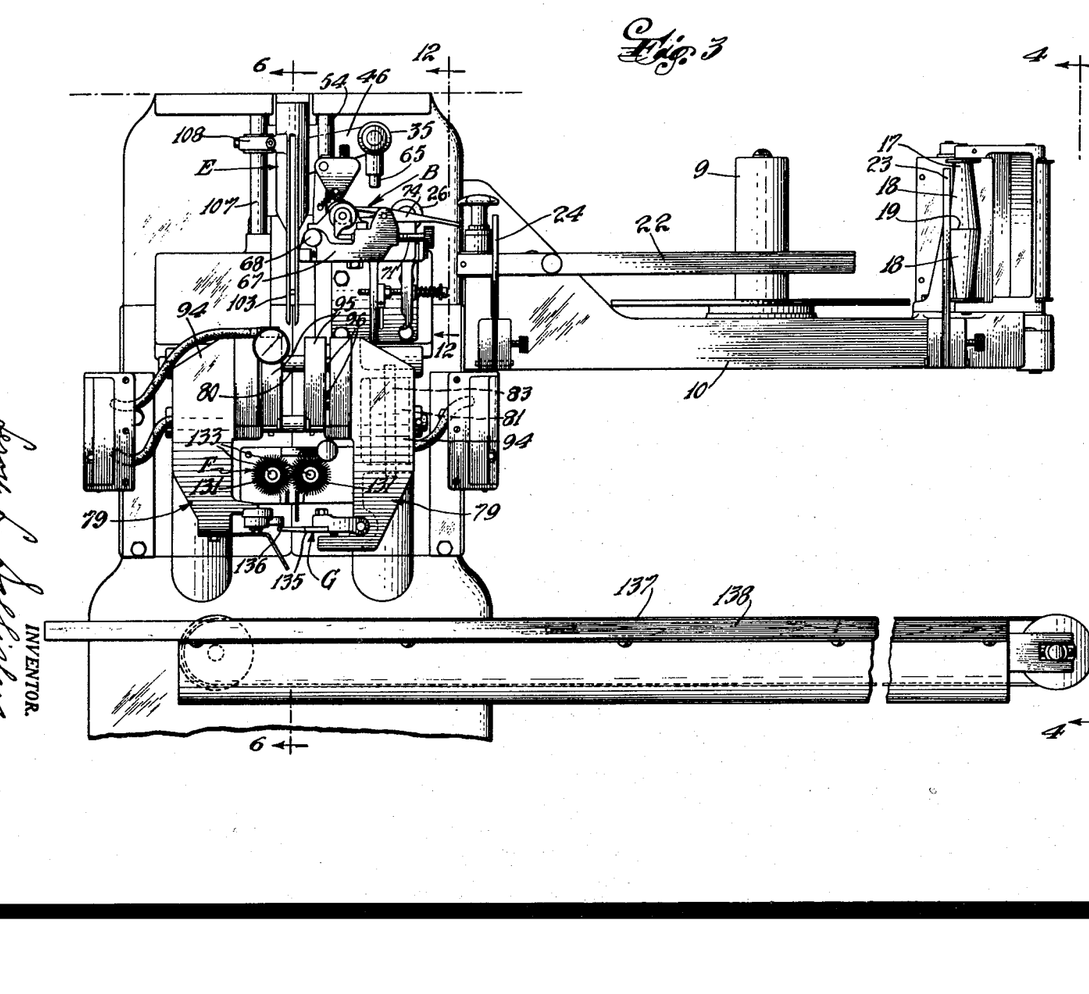
Figure 3 is a similar view of the lower portion of the machine below the line X—X of Figure 2, with immaterial portions, such as the packaging strip, omitted for clearness in illustration.
Figure 13:
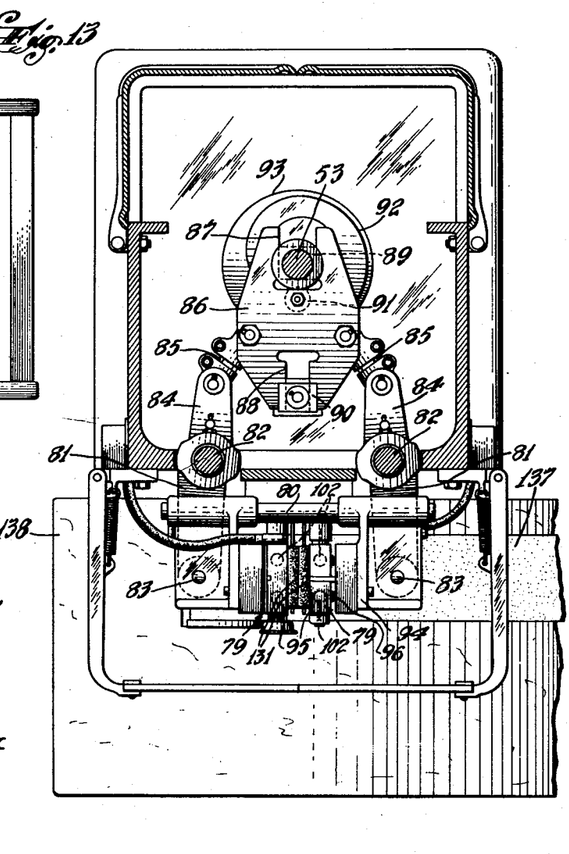
Figure 13 is a horizontal sectional view approximately on the plane of the line 13—13 of Figure 1.

In forming the packages, the sealing blocks 95 are first separated as shown in Figures 1, 3 and 13, and the packaging layers are pulled downwardly into juxtaposition between the sealing blocks. Thereupon, the sealing blocks are moved toward each other by the arms 80, 84 so as to cause the corrugations 99 and 100 to press the strips together and partially form a package to produce a bag-like structure having its upper end open between the layers at the upper ends of the sealing blocks, as shown in Figure 13, and simultaneously close the open end of the next preceding package. Where the layers are of thermoplastic material or have a thermoplastic coating on their adjacent surfaces, the sealing blocks 95 will have suitable electric heaters 102 (well known in the art) for heating the blocks to soften or fuse the thermoplastic material and seal the strips together. Where the edges of the strips are provided with ordinary adhesive, the heaters may be omitted.

Figure 7:
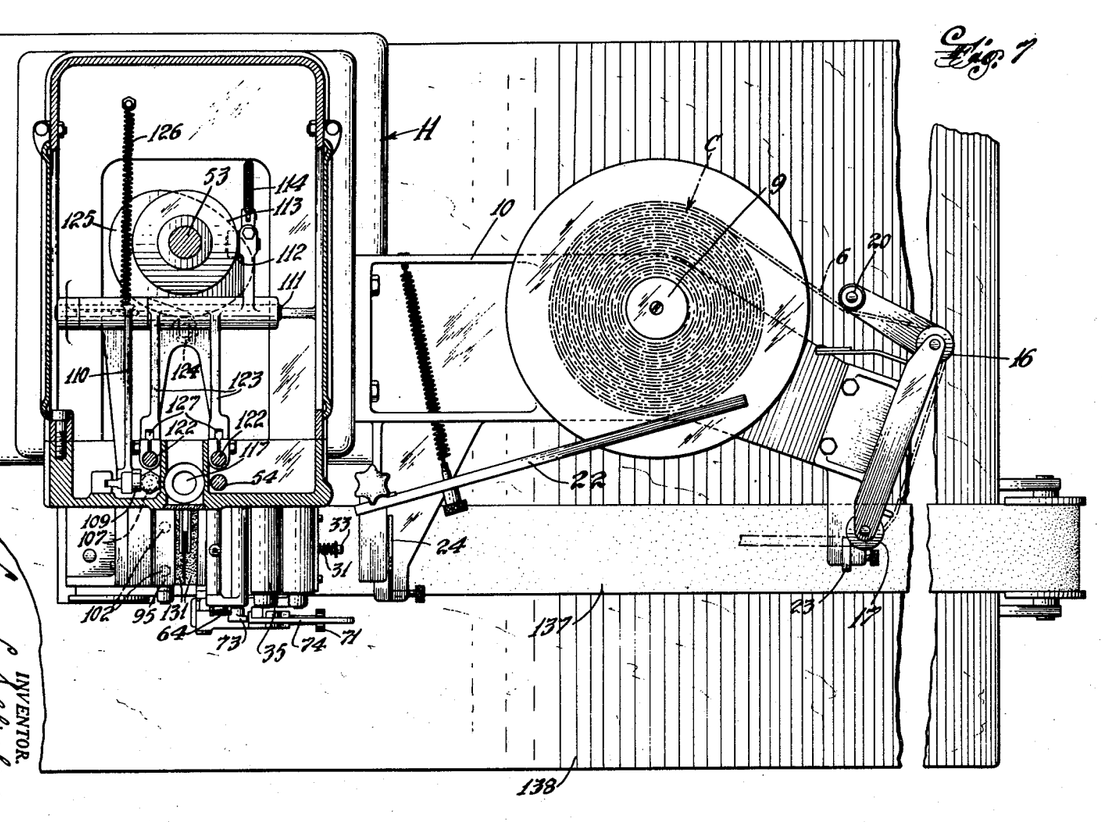
Figure 7 is a horizontal sectional view approximately on the line 7—7 of Figure 2.

After the layers have been sealed as above described, the sealed blocks are separated and the portions of the packaging layers that have been supplied by the feeding mechanism B for the next package will be pulled downwardly by the auxiliary feeding means F preparatory to the partial formation of the next package. Then the spout 103 of the feeding mechanism E is quickly lowered into the open end of the partially completed package to deposit the material to be packaged (Figs. 3, 6 and 7).

Any suitable mechanism may be provided for actuating the spout 103, but as shown, the spout is telescopically reciprocable upon an outlet tube 104 into which predetermined quantities of the substance to be packaged are ejected from a hopper 105 by a measuring and dispensing mechanism generally designated 106. For reciprocating the spout, I may utilize a vertically reciprocable shaft 107 to which the spout is secured by clamp 108, said shaft 107 being mounted in the housing of the machine and pivotally connected by a link 109 to one arm of a lever 110 pivotally mounted intermediate its ends at 111 and carrying a follower roller 112 at its other end which follows a cam 113. A tension spring 114 normally holds the roller 112 in contact with the cam 113 and the cam is connected to the main drive shaft 53. With this construction, the spout 103 is raised and lowered in timed relation to the steps of feeding the packaging layers so as to deposit the substance to be packaged into the open end of each partially filled package after the latter has been formed by the sealing blocks 95.

The measuring and dispensing mechanism comprises a chamber 115 to which the substance to be packaged is supplied by gravity from the hopper 105 through a passage 116. Said chamber has an outlet opening 117 through which is reciprocable the frusto-conical end 118 of a valve stem 119 which is screw-threaded in a guide tube 120 that is supported on a yoke 121, which is in turn mounted on the upper ends of actuating rods 122, the lower end of each of which is connected by a link 127 to one of two parallel arms 123 of a bell crank lever which is pivoted on the shaft 111 and has a roller 124 that follows a cam 125 on the drive shaft 53 and is held in contact with the cam by a spring 126. The lower end of the guide tube 120 projects into the chamber 115 and is normally in spaced relation with the outer and larger end of the frusto-conical portion 118 of the valve stem.

Figure 5:
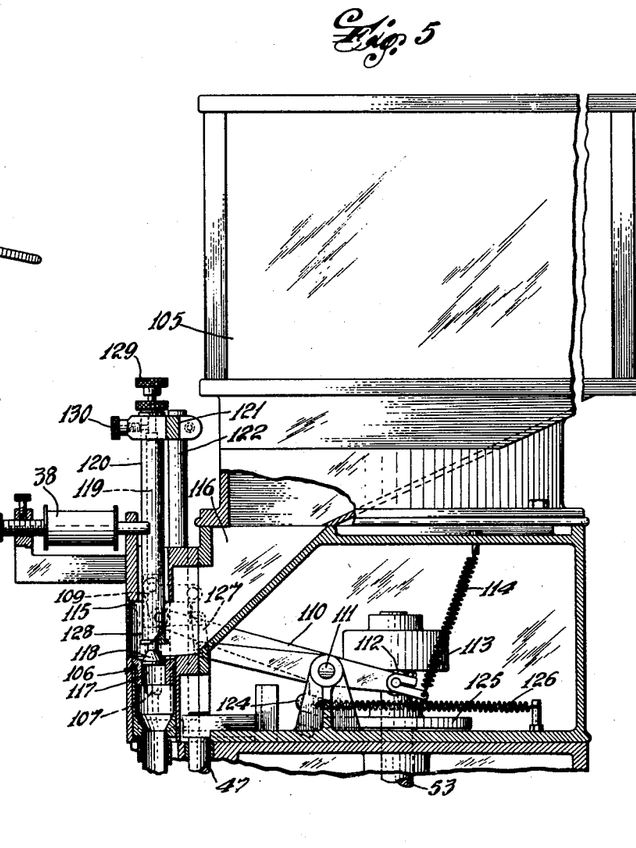
Figure 5 is a vertical longitudinal sectional view approximately on the line 5—5 of Figure 2, with portions shown in side elevation.

In operation, the valve mechanism is in the position shown in Fig. 5 with the frusto-conical portion 118 extending into the chamber 115 and with the end 128 of the guide tube spaced therefrom. The material being packaged flows by gravity around the valve stem, and as the valve stem and tube are actuated downwardly by the lever 123, a predetermined quantity of the substance is carried into the outlet opening 117 of the chamber between the walls of the latter and the outer surfaces of the valve stem and the end 128 of the guide tube. At the end of the downward movement of the valve, the frusto-conical portion 118 is projected beyond the end of the opening 117 so that the substance being packaged is deposited by gravity into the outlet tube 124 and thence into the spout 103.

The upper end of the valve stem has a thumb piece 129 whereby the distance between the frusto-conical portion 118 and the end 128 of the guide tube may be varied to vary the amount of substance dispensed upon each reciprocation of the valve mechanism. It is desirable that the guide tube be swingably supported in the yoke 21 as by a screw 130 in the yoke loosely fitting a hole in the tube whereby the tube may swing to accommodate slight misalignment thereof with the outlet opening 17. With this construction it will be seen that a predetermined quantity of the substance being packaged will be deposited in the compartment 4 of each package, which is then sealed to form a package strip or chain.

As hereinbefore described, the package strip is constantly pulled downwardly to advance it as the packages are formed in succession by the auxiliary feeding means F, which is shown as including a pair of rotatable cylindrical brushes 131 which receive the package strip between them, the bristles yieldingly and frictionally exerting pressure on opposite sides of the strip so that when the brushes are rotated in the direction indicated by the arrows the package strip will be placed under tension and pulled downwardly. The rollers are mounted in an auxiliary casing 132 on shafts 133 which are geared together and driven through a gear chain from a countershaft 134, which may in turn be driven by the main drive shaft 53 in any suitable manner. For example, this auxiliary feed mechanism may be constructed and operated in substantially the same manner as that described in my Patent No. 2,350,930.

Simultaneously with the completion of each package a previously formed package is severed from the package strip or chain by the severing mechanism G, which comprises cutting blades 135 and 136, which may also be substantially the same as a corresponding severing mechanism shown in my said Patent No. 2,350,930. The package strip is severed in one of the transverse zones 14 between the adjacent packages that are sealed together by the series of corrugations 100 on sealing blocks 95.

The severed packages may be disposed of in any suitable manner, but as shown, the packages drop in succession by gravity upon the upper reach of an endless conveyor belt 137 which runs along the top of a table 138 that is secured to the main housing of the machine.

While I have shown my invention as embodied in certain details of structure, it should be understood that this is primarily for the purpose of illustrating the principles of the invention, and that many modifications and changes may be made in the construction of the machine within the spirit and scope of the invention. It will be understood by those skilled in the art that the shafts of the cam surfaces may be modified and changed as desired to vary the time and relation of the operation of the various strip feeding mechanism, sealing mechanism, filling mechanism, etc., and the various shafts may be connected to any suitable sources of power in any suitable manner.

What I claim is:

1. Apparatus for longitudinally feeding a strip of material from a source of supply including means for periodically holding said strip against movement, an element relatively movably engaging said strip between said holding means and said source of supply, means reciprocating said element in timed relation to movement of said holding means to alternately exert and release tension on said strip while the strip is held and released respectively to withdraw predetermined quantities of said strip from said source of supply step-by-step, means for holding said strip between said feeding element and said source of supply against movement when said strip is released by the first-mentioned holding means, auxiliary feeding means for pulling said strip beyond said first-mentioned holding means when said strip is released thereby, a feed-regulating member relatively movably engaging said strip between said two holding means, means for actuating said feed-regulating member in timed relation to the reciprocating of said feeding element to cause feeding of a predetermined quantity of said strip during each step of operation, and means for adjusting said feed-regulating member to vary the quantity of said strip that is fed.

2. The apparatus defined in claim 1 wherein said feed-regulating member is a member movable in opposite directions and said means for adjusting said feed-regulating member includes means for varying the extent of movement of said feed-regulating member in one direction.

3. The apparatus defined in claim 1 wherein said feed-regulating member is a roller journaled on an eccentrically mounted shaft, said means for actuating said feed-regulating member includes a lever fixed on said shaft and a tappet cooperating therewith and reciprocable in timed relation to the reciprocation of said feeding element so as to rotate said shaft in one direction to swing said roller, and means for normally causing rotation of said shaft in the other direction, and wherein said means for adjusting said feed-regulating member includes means for varying the extent of movement of said feed-regulating member in one direction.

4. The apparatus defined in claim 1 wherein said feed-regulating member is a roller journaled on an eccentrically mounted shaft, said means for actuating said feed-regulating member includes a lever fixed on said shaft and a tappet cooperating therewith and reciprocable in timed relation to the reciprocation of said feeding element so as to rotate said shaft in one direction to swing said roller, and means for normally causing rotation of said shaft in the other direction and wherein said means for adjusting said feed-regulating member includes means for regulating the extent of the rotation of said eccentrically mounted shaft in the second-mentioned direction.

5. Apparatus for longitudinally feeding a strip of material from a source of supply including means for periodically holding said strip against movement, a feeding element relatively movably engaging said strip between said holding means and said source of supply, means reciprocating said element in timed relation to movement of said holding means to alternately exert and release tension on said strip while the strip is held and released respectively to withdraw predetermined quantities of said strip from said source of supply step-by-step, adjustable means between said element and said holding means and engaging said strip for varying the feed of said strip by said element, said adjustable means comprising an eccentrically mounted roller over which said strip passes from said element to said holding means, and means for oscillating said roller in timed relation to the movement of said feeding element to cause feeding of a predetermined amount of said strip during each step of movement.

6. Apparatus for longitudinally feeding a strip of material from a source of supply including means for periodically holding said strip against movement, a feeding element relatively movably engaging said strip between said holding means and said source of supply, means reciprocating said element in timed relation to movement of said holding means to alternately exert and release tension of said strip while the strip is held and released respectively to withdraw predetermined quantities of said strip from said source of supply step-by-step, adjustable means between said element and said holding means and engaging said strip for varying the feed of said strip by said element, said adjustable means comprising an eccentrically mounted roller over which said strip passes from said element to said holding means, means for oscillating said roller in timed relation to the movement of said feeding element to cause feeding of a predetermined amount of said strip during each step of movement, means for holding said strip between said feeding element and said source of supply against movement when said strip is released by the first-mentioned holding means, and auxiliary feeding means for pulling said strip beyond the first-mentioned holding means when said strip is released thereby.

7. The apparatus as defined in claim 5, with the addition of means manually operable at will for adjusting said eccentrically mounted roller to vary the amount of said strip that is fed by said feeding element.

8. The apparatus as defined in claim 5, wherein said eccentrically mounted roller includes an eccentrically mounted shaft and a roller journaled on said shaft, and with the addition of means for normally causing rotation of said shaft in one direction, an arm mounted at one end of said eccentrically mounted shaft, an adjustable stop screw engaging said arm for limiting the extent of rotation of said eccentrically mounted shaft in said direction, whereby upon rotation of said screw in opposite directions said shaft may be rotated in opposite directions to oscillate said roller for increasing and decreasing the amount of feed of said strip, respectively.

9. The apparatus as defined in claim 8, with the addition of means mounting said stop screw to provide for instantaneous manual disengagement of said screw from said arm to release said eccentrically mounted shaft for rotation in said direction to increase the amount of feed of said strip to the maximum, and means for instantaneously manually actuating said arm in the opposite direction to decrease the amount of feed of said strip to the minimum.

10. The apparatus defined in claim 1, wherein said feed-regulating member is a roller journaled on an eccentrically mounted shaft, said means for actuating said feed-regulating member includes a lever fixed on said shaft and a tappet cooperating therewith and reciprocable in timed relation to the reciprocation of said feeding element so as to rotate said shaft in one direction to swing said roller, and means for normally causing rotation of said shaft in the other direction and wherein said means for adjusting said feed-regulating member includes an arm on said eccentrically mounted shaft, an adjustable stop screw engaging said arm for limiting the extent of rotation of said eccentrically mounted shaft in the second-mentioned direction, and means mounting said stop screw to provide for instantaneous manual disengagement thereof from said arm to release said eccentrically mounted shaft for rotation in said second-mentioned direction to increase the amount of feed of said strip to the maximum.

11. The apparatus as defined in claim 10, with the addition of means for instantaneously manually actuating said arm in the opposite direction to decrease the amount of feed of said strip to the minimum.

12. Apparatus for longitudinally feeding a strip of material from a source of supply including means for periodically holding said strip against movement, a feeding element relatively movably engaging said strip between said holding means and said source of supply, means reciprocating said element in timed relation to movement of said holding means to alternately exert and release tension on said strip while the strip is held and released respectively to withdraw predetermined quantities of said strip from said source of supply step-by-step, a feed-regulating member between said feeding element and said holding means and engaging said strip for varying the feed of said strip by said feeding element, means for moving said feed-regulating member alternately in opposite directions in timed relation to said feeding element to cause feeding of a predetermined amount of said strip during each step of movement, means for normally yieldingly moving said feed-regulating member in one direction, and an adjusting device for limiting movement of said feed-regulating member in said direction and for manually moving said feed-regulating member in the opposite direction.

13. The apparatus as defined in claim 12, with the addition of a mounting for said adjusting device providing for instantaneous manual manipulation of said device to release said feed-regulating member for free movement in the first-mentioned direction.

14. The apparatus as defined in claim 12, with the addition of manually operable means for instantaneously actuating said feed-regulating member in the second-mentioned direction.

15. The apparatus as defined in claim 13, with the addition of manually operable means for instantaneously actuating said feed-regulating member in the second-mentioned direction.

LEROY L. SALFISBERG.

REFERENCES CITED

The following references are of record in the file of this patent:

UNITED STATES PATENTS

| Number | Name | Date |
|---|---|---|
| 439,723 | Cox | Nov. 4, 1890 |
| 734,215 | Bilgram | July 21, 1903 |
| 1,463,879 | Downing | Aug. 7, 1923 |
| 1,936,291 | Dodge | Nov. 21, 1933 |
| 2,081,654 | Wohlrabe | May 25, 1937 |
| 2,162,230 | Salfisberg | June 13, 1939 |
| 2,199,708 | Maxfield | May 7, 1940 |
| 2,245,827 | Salfisberg | June 17, 1941 |